Dec. 10, 1929.   L. DUNKELSBERG   1,738,990
AUXILIARY LENS ATTACHMENT FOR GLASSES
Filed July 12, 1927
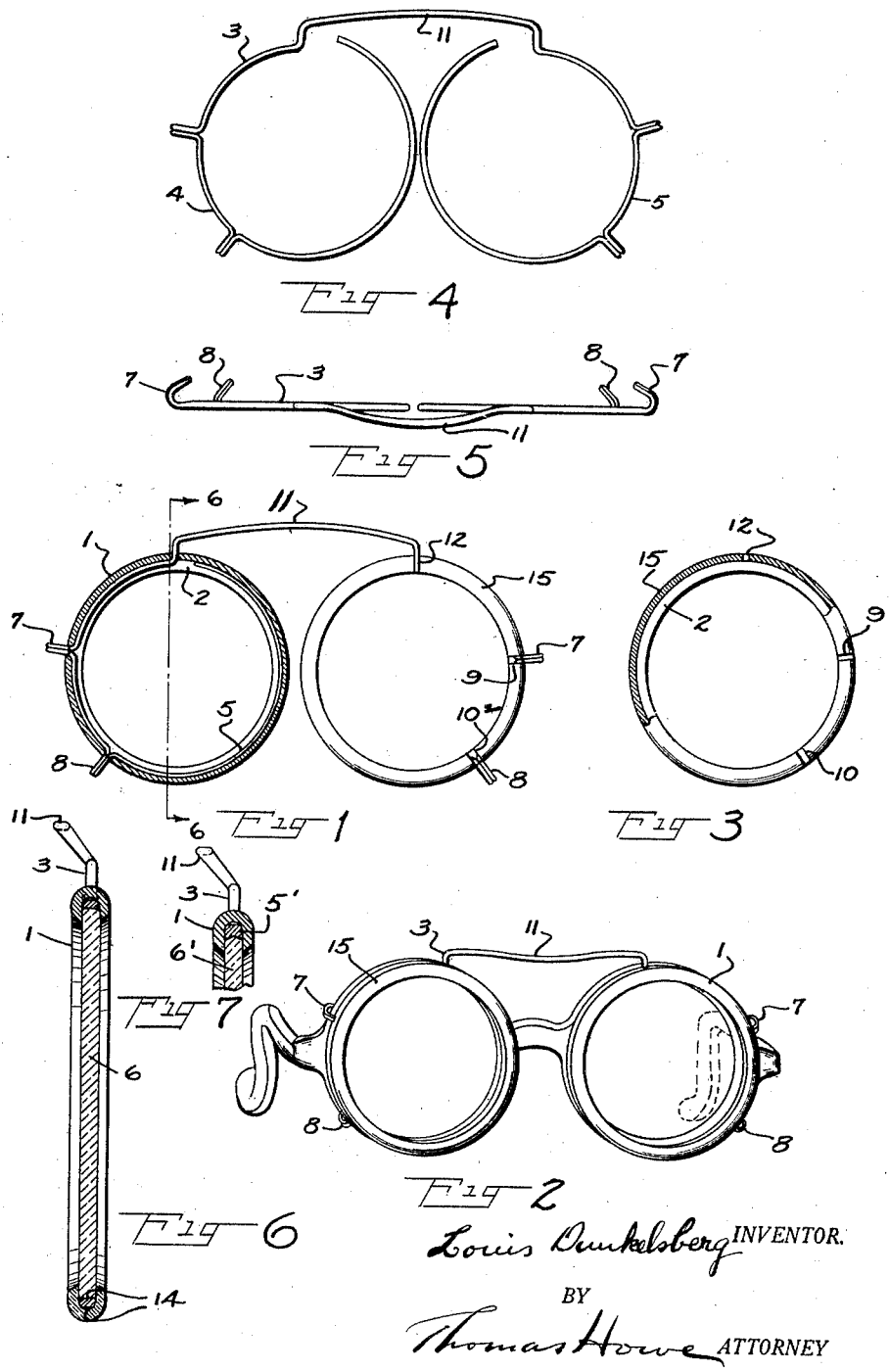

Patented Dec. 10, 1929

1,738,990

UNITED STATES PATENT OFFICE

LOUIS DUNKELSBERG, OF NEW YORK, N. Y.

AUXILIARY LENS ATTACHMENT FOR GLASSES

Application filed July 12, 1927. Serial No. 205,078.

This invention relates to lens supports, and more particularly to auxiliary lens supports, such as attachments for mounting anti-glare lenses which may be readily attached to, and detached from, the frame of a pair of spectacles.

An object of the invention is to provide an improved structure of lens support.

Another object of the invention is to provide an auxiliary lens device which may be easily and quickly attached to the frame of a pair of glasses.

Another object is to simplify the construction of auxiliary lens devices and improve the method of construction and the manner of application to present existing glasses.

Further and more definite objects will be pointed out in the following specification, claims and drawings, in which,—

Fig. 1 represents my invention as embodied in an improved form of auxiliary lens device, showing one of the rims in section and the position taken by the connecting member;

Fig. 2 shows the position of the device when applied to an ordinary pair of eye glasses or spectacles;

Fig. 3 shows a view of another frame, partly in section and indicating the arrangement of holes or slots in its periphery for accommodating the connecting member;

Fig. 4 shows the front elevation of the connecting member to be applied to the frames;

Fig. 5 shows the top plan view of the connecting member, as shown in Fig. 4;

Fig. 6 shows a cross sectional view of the frame which is shown in elevation in Fig. 1, along the lines 6—6 of this figure; and Fig. 7 is a partial section, similar to Fig. 6 showing a modified construction of the connecting member.

Referring to the drawings, the rim or frame 1 may be constructed of zylonite, rubber, or other suitable material, and may be formed with the groove 2 in the inside of the frame for receiving the lens in the ordinary manner. The connecting member 3 is arranged with a loop portion 4 interconnected with the loop portion 5 by a bridge portion 11. It will be seen that the loops with the attaching hooks to be hereinafter more particularly referred to, and bridge portion, are formed by one continuous piece of wire of suitably springy material, bent appropriately to form the loops, bridge and hooks. These loops are definitely tensioned to the position shown in Fig. 4 and when they spring into the groove 2 of the rim 1, will occupy a position at the bottom of this groove, as shown in Fig. 1.

With the loop in this position, at the bottom of the groove, a light-affecting lens 6 may be inserted within the rim by proper softening of the material through heat, or otherwise. The two loops having thus been inserted in two similar rims, the rims will be secured together by the bridge piece and a unitary structure formed.

In order to maintain the frames in position on a pair of eye glasses, hooks, such as 7 and 8, may be provided at intermediate points on the loop which is inserted in the groove, and which in the structure shown, are bent up out of the wire of the member 3. Slots or holes 9 and 10 may be provided in the edges of the rims to permit these hooks to project from the frames. The interconnecting spring bridge portion 11 of the connecting member may also be positioned in slots 12 so that they may more readily fit the flat surface of a pair of glasses. The arrangement of these slots or holes 9, 10 and 12 is more clearly shown in Fig. 3 and it is not necessary that they take the exact form therein shown, but might as well be arranged in any other suitable form. The connecting member may be formed of flattened spring metal wire, or may be partly flattened and partly rounded, as shown in the cross sectional view of Fig. 6. The flattened parts 14 permit the use of shallower grooves. If the wire or connecting spring is flattened at the interconnecting portion 11, such flattening will aid in increasing the resilience between the rims in the proper way to more readily attach them for use with ordinary eye glasses as shown in Fig. 2. It will be observed that in the drawings the bridge piece 11 is curved transversely of the plane of the rims.

These rims in the form shown, are definitely tensed towards each other by the interconnecting spring piece or bridge 11 but such construction may be modified to suit the demands, and the frames may just as well be tensed in a direction to separate from each other, the only change then being necessary would be the placing of the hooks at the inner sides of the rims, rather than at the outside edges.

The rim 15 is constructed in the same manner as the rim 1, except that the slots are arranged in reverse positions and the same numerals are applied to these slots. The loop is inserted in the same manner as in the case of the frame 1, with the hooks 7 and 8 extending in the opposite direction from the hooks in the other rim.

It can thus be seen that a simple, efficient, and easily constructed auxiliary lens device, which is pleasing in its appearance to the eye may be constructed in the manner indicated, with a minimum of expense. The rims may be constructed and manufactured as a standard part, and only a simple bending operation is required to produce a connecting member 3. The lens 6 in each of the rims may be for anti-glare purposes or of any other conformation or character to accomplish the object in view.

The inner side of the part of the member 3 which is within the rim 1 may have a groove formed in it for the reception of the edge of the lens, as shown in Fig. 7, wherein the grooved part of the member 3 is shown at 5' and receives the lens 6'.

It is not intended to be limited to the exact construction shown in the drawings, but variations and changes may well be made within the spirit and scope of the following claims.

I claim:

1. An auxiliary lens device comprising lens supporting means, including lens rims and a connecting member for said rims secured to one of said rims and secured to and extending in a groove circumferentially in the other of said rims, and means for securing said device to eye glasses extending from the circumferentially extending part of said connecting member.

2. A lens supporting means for eye glasses comprising lens rims, each having a circumferentially extending groove and a connecting member for said rims secured to one of said rims and secured to and extending in a curve circumferentially in the other of said rims, the last-mentioned rim having an internal circumferential groove within which said connecting member extends and means extending from the curved portion of said connecting member for securing the lens supporting means to eye glasses.

3. A lens supporting means for eye glasses comprising in combination lens rims having circumferential grooves and a connecting member extending in a curve in said grooves in each of said rims and from one rim to the other, and means extending from the curved portion of said connecting member for securing said supporting means to an eye glass frame.

4. An auxiliary lens device consisting of non-metallic rims having internal grooves, a metallic connecting member having curved portions applied to said grooves and having an interconnecting portion having a definite bias effect on said rims with respect to each other, said member having projecting catches adapted to be clipped over an eye glass frame.

5. An auxiliary lens device comprising rims having grooves, an outwardly tensed spring piece having its ends inserted in said grooves, a connecting part of said piece for said rims and hooks formed on said piece and projecting from said rims adapted to snap over an eye glass frame.

6. A lens supporting device comprising an integral reinforcing metallic piece, rims for lenses covering the end portions of said piece substantially throughout their circumference, said metallic piece having an uncovered portion for interconnecting the rims in a resilient manner.

7. An auxiliary lens device comprising an integral reinforcing metallic piece, rims for lenses covering the end portions of said piece substantially throughout their circumference, said metallic piece having a portion for interconnecting the rims in a resilient manner and hooks formed integral with the reinforcing piece projecting beyond the rims for grasping the rims of a pair of eyeglasses.

In testimony whereof I have signed this specification this 25th day of June 1927.

LOUIS DUNKELSBERG.